(12) United States Patent
Kittel et al.

(10) Patent No.: US 6,274,076 B1
(45) Date of Patent: Aug. 14, 2001

(54) POSTFORMING OF A SHAPED CORD ON AN OBJECT

(75) Inventors: Florez Kittel, Würselen; Helmut Krumm, Aachen, both of (DE)

(73) Assignee: Saint-Gobain Vitrage, Courbevore (FR)

( * ) Notice: Subject to any disclaimer, the term of this patent is extended or adjusted under 35 U.S.C. 154(b) by 0 days.

(21) Appl. No.: 09/433,012

(22) Filed: Nov. 3, 1999

Related U.S. Application Data

(62) Division of application No. 08/907,018, filed on Aug. 6, 1997, now Pat. No. 5,984,656.

(30) Foreign Application Priority Data

Aug. 9, 1996 (DE) ............................................. 196 32 149

(51) Int. Cl.[7] ........................... B29C 33/42; B29C 43/28; B29C 45/14
(52) U.S. Cl. ........................... 264/266; 264/320; 264/322
(58) Field of Search ................................. 264/163, 252, 264/266, 296, 320, 322

(56) References Cited

U.S. PATENT DOCUMENTS

| | | | |
|---|---|---|---|
| 2,916,771 | 12/1959 | Lang et al. | 425/403 |
| 4,521,175 | 6/1985 | Medwed | 425/403 |
| 4,728,381 | 3/1988 | Jezuit et al. | 425/125 |
| 5,057,265 | 10/1991 | Kunert et al. | 264/511 |
| 5,302,333 | 4/1994 | Capriotti et al. | 264/252 |
| 5,316,829 | 5/1994 | Cordes et al. | 296/93 |
| 5,456,874 | 10/1995 | Cordes et al. | 264/138 |
| 5,519,979 | 5/1996 | Kunert et al. | 296/93 |
| 5,547,359 | 8/1996 | Cordes et al. | 425/125 |
| 5,580,628 | 12/1996 | Cordes et al. | 296/93 |
| 5,648,036 | 7/1997 | Glang et al. | 425/127 |

FOREIGN PATENT DOCUMENTS

| | | |
|---|---|---|
| 0 297 739 | 1/1989 | (EP) . |
| 2 206 523 | 1/1989 | (GB) . |
| WO 95/35193 | 12/1995 | (WO) . |
| WO 96/19339 | 6/1996 | (WO) . |

OTHER PUBLICATIONS

Abstract of German 2365723 (Jul. 9, 1973).
Abstract of German 2611255 (Mar. 15, 1976).

*Primary Examiner*—Leo B. Tentoni
(74) *Attorney, Agent, or Firm*—Pennie & Edmonds LLP

(57) ABSTRACT

A shaped cord (2) is postformed in the shape of a frame extruded onto a glass (1) and is slightly curved in the direction of the length of shaped cord (2). A forming mold (4) is used in a postforming operation, with lateral edges (11, 12) that are slightly above the surface of shaped cord (2). This avoids the creation of imprints in the form of lines or edges on the shaped cord, and a smooth transition is achieved between the postformed length of the shaped cord that attaches thereto.

18 Claims, 2 Drawing Sheets

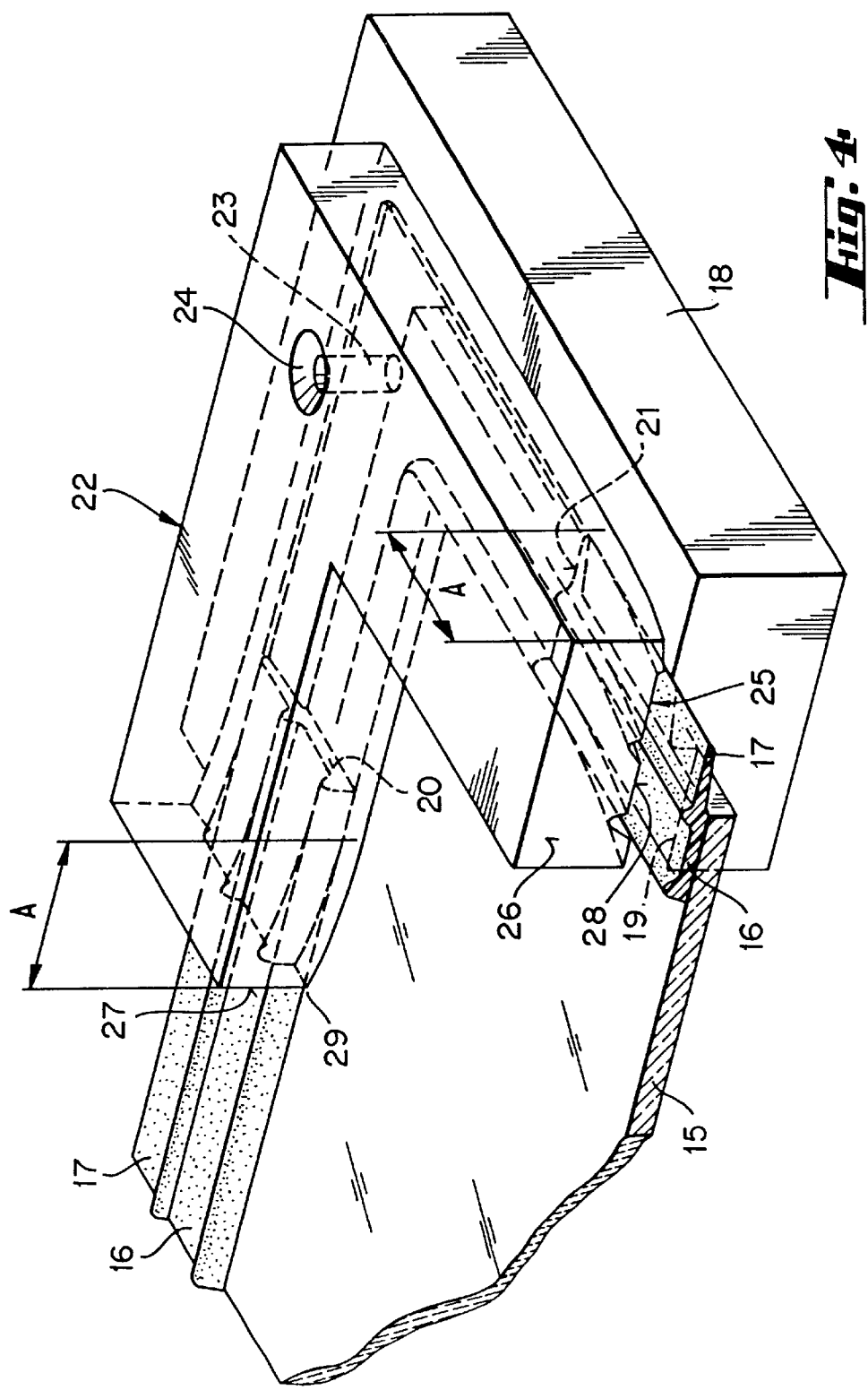

POSTFORMING OF A SHAPED CORD ON AN OBJECT

CROSS REFERENCE TO RELATED APPLICATION

This application is a division of application Ser. No. 08/907,018 filed Aug. 6, 1997, now U.S. Pat. No. 5,984,656.

BACKGROUND OF THE INVENTION

This invention pertains to a forming mold for postforming of an shaped polymer cord that is extruded onto an object.

It is known that vehicle windows are equipped with a frame or frame-shaped elements by extruding directly onto a glass a shaped cord that is made of an extrudable polymer in a corresponding manner. Likewise, other plate-like objects such as, for example, doors can be equipped with a frame-shaped sealing joint. Generally, however, the shaped cord extruded onto the object has to be postformed in certain places, for instance, in the transition zone between the beginning and end of a closed frame. Such postforming may also be necessary or advantageous in the area of the corners of a shaped frame, particularly in the case of sharp corners.

Extrudable polymers that are used for the above-mentioned purposes include both reaction systems, for example, polyurethane systems that harden under the action of moisture, and thermoplastic systems. In the case of reaction systems, the postforming may be done right after the extrusion operation before the extruded polymer cord hardens. Such a postforming process and the appropriate compression molds for implementing it are described in documents U.S. Pat. No. 5,519,979 and German patent no. DE-G-U1 90 11 573. In the case of a reaction system, the postforming may also be done after the shaped cord hardens. A corresponding process and an appropriate mold for implementing it, comprising a forming mold, are the objects of documents U.S. Pat. No. 5,057,265.

Devices that comprise a forming mold for the postforming of the transition zone of a thermoplastic polymer frame that is extruded onto a glass are described in documents WO 95/35193 and WO 96/19339.

In all of the known devices for postforming, the forming surface of the forming mold is adapted over its entire length to the geometry of the extruded shaped cord. This means that, for example, in the case of an extruded frame on a flat glass, the shaped forming surface is rectilinear.

When postforming is done with the aid of the known forming mold, it may happen that joint lines, which are caused by the edges at the end faces of the forming mold, are visible at the transition points between the postformed section length and the lengths of the initial extruded sections. Such visible joint lines show up in particular when the dimensions, in terms of height, of the shaped extruded cord or the shape and thickness of the objects vary slightly within the limits of the given tolerances.

SUMMARY OF THE INVENTION

The present invention provides a method for postforming a length of shaped polymer cord that has been extruded on an object and has a predetermined height above the object, which comprises applying on the cord a forming surface extending in the direction along the length of the cord. The forming surface comprises two sections extending along the length of the cord with the first section engaging, at least in part, the object and the second section being disposed laterally of the first section for overlying the cord when the first section is in engagement with the object. The second section of the forming surface further comprises two portions extending along the length of the cord with the first portion being disposed at a height above the object which is less than the predetermined height and the second portion being disposed at a height greater than the predetermined height.

According to the invention, the second section of the forming surface may also comprise a center and two end portions extending along the length of the cord with the center portion being disposed at a height less than the predetermined height and the two end portions being disposed at a height greater than the predetermined height.

The present invention also provides a method for postforming a length of shaped thermoplastic polymer cord, which comprises applying a shaped thermoplastic polymer cord having a predetermined height on an object and applying on the cord a forming surface that has portions of different heights with one of the height being less than the predetermined height and the other height greater than the predetermined height. The method results in postforming the different heights onto the length of the shaped thermoplastic polymer cord.

BRIEF DESCRIPTION OF THE DRAWINGS

Other features and advantages of the invention will emerge from the dependent claims and the following description of embodiments, with reference to the attached drawings.

FIG. 4 shows a device according to the invention for postforming a polymer frame in the corner area of a glass using an injection molding process.

DETAILED DESCRIPTION OF THE INVENTION

Figure 1:
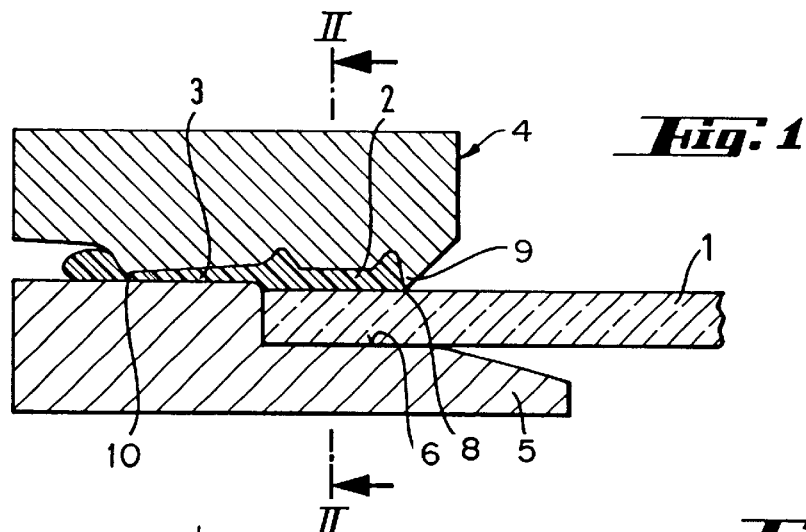
FIG. 1 is a schematic representation of a cross-section of a tool for postforming a shaped thermoplastic cord.

The invention provides a tool of the type mentioned in the preamble for the purpose of localized postforming of a shaped cord that is extruded onto an object, in which the occurrence of visible joint lines between the postformed zone and the shaped cord adjacent thereto is avoided. This is achieved by virtue of the fact that the forming surface of the forming mold is curved, at least in the lateral end areas, in the direction of the length of the shaped cord.

In this case, the extent of the curvature should be selected such that, when the mold is in its final position in the postforming operation, the lateral edges of the forming surface are no longer in contact with the surface of the shaped cord, even in the case where the thickness of the shaped cord is at the upper limit of the tolerance range, but still considerably above said surface. It has been found that, as a general rule, this condition is satisfied when the difference in height between the zones of the forming mold that are adjacent to the surface of the object and the corresponding edges of the forming surface at the end faces of the forming mold is 0.1 to 1 mm, and preferably 0.2 to 0.6 mm. In this way, no imprint in the form of a line or edge is created; rather, in each case, there is a smooth gradual transition between the postformed length and the shaped-cord lengths attached thereto. In the majority of the cases, this gradual transition is not visible to the naked eye, and the shaped cord is uniform in appearance in this zone as well.

According to an advantageous development of the invention, the forming surface of the forming mold is provided with a constant curvature over its entire length. In the case of such a forming mold with a length of 8 cm, for example, as is appropriate for the postforming of the transition area between the beginning and end of a shaped cord, a difference in height of 0.5 mm between the edges of the forming surface and the lowest point is reached when the radius of the circular curvature of the forming surface is approximately 1500 mm. For technical reasons, forming molds that have the same radius of curvature over their entire length can be more easily manufactured than can forming molds that have only curved end areas. The area of a shaped cord that is postformed with the aid of such a forming mold is homogeneous in appearance and creates no discontinuity in the postformed surface.

The forming molds designed according to the invention can be used to the same advantage for all known postforming processes since the basic problem is observed in principle in all of the postforming processes described in the preamble.

Onto the edge of a glass 1 is extruded a shaped cord 2, which has a sealing and centering lip 3 that protrudes beyond the edge of glass 1. In the transition zone between the beginning and end of extruded shaped cord 2, 3, the shaped cord is to be postformed. In the case shown, shaped cord 2, 3 is made of a thermoplastic elastomer. For postforming, in this case a heated forming mold 4 is used. To postform lip 3, forming mold 4 works with a corresponding die 5, which is equipped with a cavity 6 into which the edge of glass 1 is inserted.

In order to carry out postforming, forming mold 4 is lowered onto shaped cord 2 in an inclined position such that edge 8 of wedge-shaped protrusion 9 touches the glass surface. Forming mold 4 is then caused to pivot around edge 8 until outside cutting edge 10 touches the surface of die 5. During this pivoting operation, the postforming of shaped cord 2 and lip 3 takes place. In effect, the height of a part of the shaped cord 2 above the glass 1 is reduced and the excess portion of the polymer compound that has flowed out during this operation is cut away by cutting edge 10.

Figure 2:
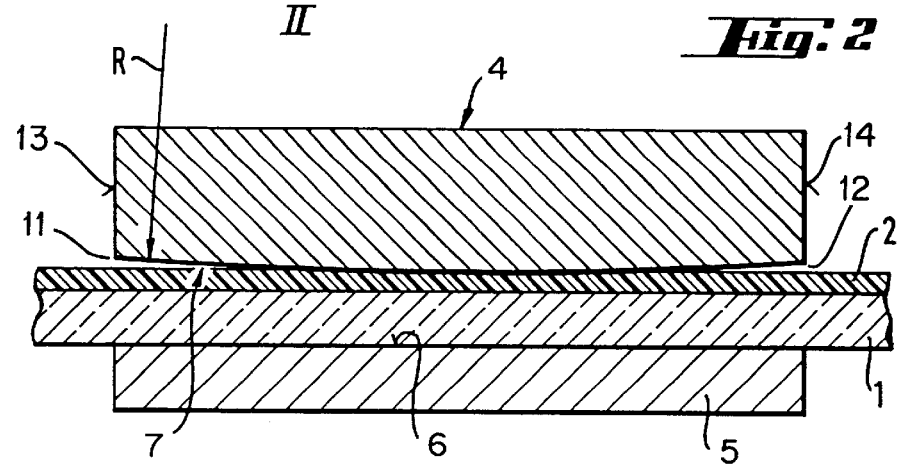
FIG. 2 is a longitudinal-section view in plane II—II of FIG. 1.
Figure 3:
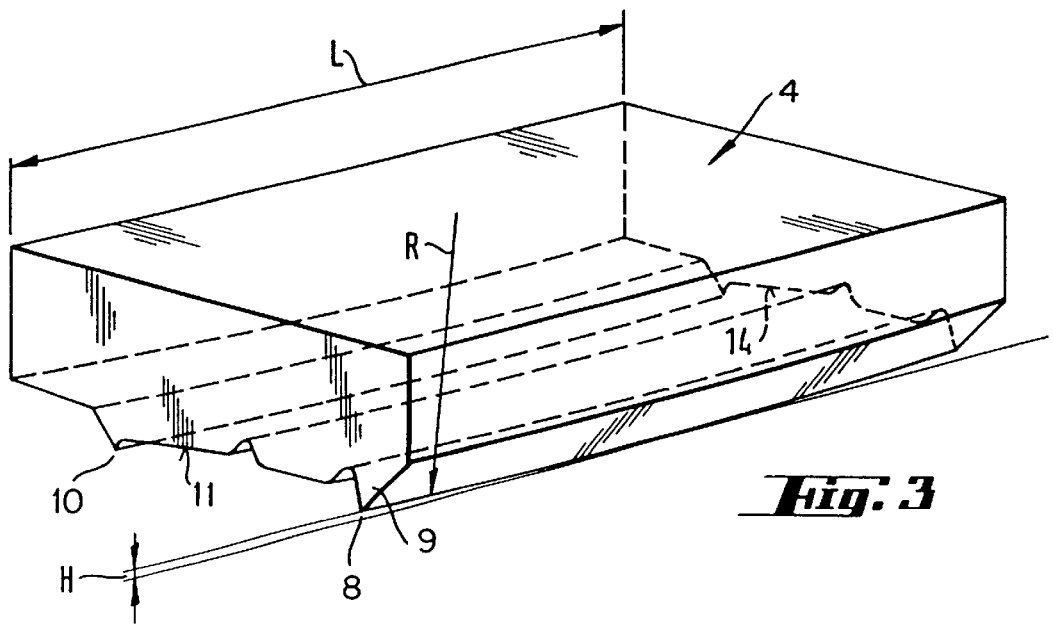
FIG. 3 is a perspective view of a forming mold according to the invention for the tool depicted in FIG. 1.

The curvature, according to the invention, of forming mold 4 is shown in FIGS. 2 and 3. Overall, forming surface 7 has a slight cylindrical curvature. The extent of the curvature is preferably selected such that radius R at edge 8 is 100 to 400 cm, and in particular 200 to 350 cm. In the case where the length of the forming mold is, for example, 6–10 cm, this means that height difference H between the lowest median cross-section line of forming surface 7 and edges 11, 12 at two end faces 13, 14 of the forming mold is from 0.1 to 1 mm, and preferably 0.2 to 0.8 mm. In this case it is ensured that, as FIG. 2 shows in particular, edges 11, 12 are slightly above the surface of shaped cord 2. Thanks to these geometric dimensions, optimum results are obtained in the case of ordinary frame-like sections.

One embodiment of a device according to the invention that is helpful in later producing a frame-shaped section 16 that is extruded onto a glass 15 in the area of a sharp right-angled corner of the glass is shown in FIG. 4. Glass 15 is again inserted into a lower forming plate 18, which is equipped with a recess 19. Recess 19 corresponds to the contour of the edge of the glass and to the lower shape of lip 17.

Frame-shaped section 16, which can be composed of, for example, a hardening reaction system, was mechanically lifted from the corner area, in the process of being cut off at separation surfaces 20, 21 and removed from the glass surface.

In this case forming mold 22 is designed as an injection mold in which the hollow space that is bounded by the plate 18, the separation surfaces 20, 21 and the forming surface 25 is equipped, via a drilled hole 23, with an injection hole 24, through which the polymer is injected into the hollow molding space via a corresponding injection nozzle.

In its end parts, each of the two branches of forming mold 22 has a curvature, according to the invention, of length A. Length A corresponds approximately to the length of the part of frame-shaped section 16 that is covered by the forming mold. The radius of curvature of shaped forming surface 25 is again selected such that edges 28, 29 of forming surface 25 at end faces 26, 27 of the forming mold are always slightly above the surface of frame-shaped section 16 when the mold is closed.

What is claimed is:

1. A method for postforming a length of polymer shaped cord that has been extruded onto an object and which rises a predetermined height above said object, which comprises applying on the cord a forming surface extending in a direction along the length of the cord, said forming surface having:
   (a) a first section extending along said direction for, at least in part, engaging said object;
   (b) a second section extending along said direction and disposed laterally of said first section for overlying said cord when said first section is in engagement with said object; and
   (c) said second section having first and second portions extending along said direction, said first portion being disposed at a first height above said object which is less than said predetermined height and said second portion being disposed at a second height greater than said predetermined height, said first and second heights being measured when said first section is in engagement with said object, thus postforming said cord.

2. The method according to claim 1, wherein:
   (a) said first section includes first and second portions disposed laterally of said first and second portions, respectively, of said second section; and
   (b) the second portion of said first section is spaced above said object when said first portion of said first section is in engagement with said object.

3. The method according to claim 2, wherein:
   (a) the first and second portions of said first and second sections define a predetermined length extending along said direction; and
   (b) said forming surface is curved in the direction of said predetermined length at a constant radius of curvature.

4. The method of claim 1 which further comprises compression molding the cord with the forming surface.

5. The method of claim 1 which further comprises injection molding a portion of cord within the space between the forming surface and the extruded cord.

6. A method for postforming a length of shaped polymer cord having a predetermined height on an object, which comprises applying on the cord a forming surface extending in a direction along the length of the cord, said forming surface having:
   (a) a first section extending along said direction for, at least in part, engaging said object;
   (b) a second section extending along said direction and disposed laterally of said first section for overlying said cord when said first section is in engagement with said object; and (c) said second section having a center and two end portions extending along said direction, said center portion being disposed at a first height less than said predetermined height and said end portions being disposed at a second height greater than said predetermined height, said first and second heights being measured when said first section is in engagement with said object, thus postforming said cord.

7. The method according to claim 6, wherein:

(a) said first section includes a center and two end portions disposed laterally of said center and end portions, respectively, of said second section; and (b) the end portions of said first section are spaced above said object when said center portion of said first section is in engagement with said object.

8. The method according to claim 7, wherein the end portions of the first section have curvatures that define a height difference between the end portions of the first section and the center portion of the first section of between about 0.1 mm and about 1.0 mm.

9. The method according to claim 7, wherein the end portions of the second section have curvatures that define a height difference between the end portions of the second section and the center portion of the second section of between about 0.1 mm and about 1.0 mm.

10. The method according to claim 7, wherein:

(a) the center and end portions of the first and second sections define a predetermined length extending along said direction; and (b) said forming surface is curved in the direction of said predetermined length at a constant radius of curvature.

11. The method of claim 6, wherein the forming surface further compression molds the shape of the cord.

12. The method of claim 6, wherein the object is placed on a forming plate which supports the object and the cord and is in opposed relation to the forming surface.

13. The method of claim 12, wherein the forming surface further comprises a hole and which further comprises injection molding polymer through the hole and within the space formed by the forming surface, the object, the forming plate, and the cord.

14. The method of claim 6 which further comprises heating the forming surface to soften, form, and shape the cord.

15. A method for postforming a length of shaped thermoplastic polymer cord, which comprises applying a shaped thermoplastic polymer cord having a predetermined height on an object; and applying on the cord a forming surface which has portions of different heights, one of which is less than the said predetermined height and the other of which is greater than the said predetermined height, in order to postform said different heights onto the length of shaped polymer cord.

16. The method of claim 15 wherein the cord is a thermoplastic polymer cord and which further comprises heating the forming surface to soften, form, and shape the polymer cord.

17. The method of claim 15 which further comprises applying said different heights sequentially along the length of the cord.

18. The method of claim 15 wherein the cord is extruded on the object and which further comprises adding additional material during postforming of the cord.

* * * * *